(12) United States Patent
Falaschi et al.

(10) Patent No.: US 10,190,636 B2
(45) Date of Patent: Jan. 29, 2019

(54) COVER FOR A BEARING HOUSING AND A SUPPORT ASSEMBLY FOR ROTATING SHAFT ASSOCIATED

(71) Applicant: Aktiebolaget SKF, Gothenburg (SE)

(72) Inventors: Fabio Falaschi, Massa-Carrara (IT); Davide Zanghi, Turin (IT)

(73) Assignee: Aktiebolaget SKF, Göteborg (SE)

( * ) Notice: Subject to any disclaimer, the term of this patent is extended or adjusted under 35 U.S.C. 154(b) by 0 days.

(21) Appl. No.: 15/563,668

(22) PCT Filed: Mar. 24, 2016

(86) PCT No.: PCT/IB2016/000371
§ 371 (c)(1),
(2) Date: Oct. 2, 2017

(87) PCT Pub. No.: WO2016/156963
PCT Pub. Date: Oct. 6, 2016

(65) Prior Publication Data
US 2018/0066710 A1    Mar. 8, 2018

(30) Foreign Application Priority Data

Mar. 31, 2015  (IT) .......................... 102015000010467

(51) Int. Cl.
*F16C 33/72* (2006.01)
*F16C 35/04* (2006.01)

(52) U.S. Cl.
CPC .......... *F16C 33/723* (2013.01); *F16C 35/045* (2013.01); *F16C 2208/10* (2013.01)

(58) Field of Classification Search
CPC ..................................................... F16C 33/726
See application file for complete search history.

(56) References Cited

U.S. PATENT DOCUMENTS

| 5,172,984 | A | * | 12/1992 | Lederman | ............... B60B 7/002 384/489 |
| 5,195,807 | A | * | 3/1993 | Lederman | ............... B60B 7/002 301/108.1 |
| 5,380,103 | A | * | 1/1995 | Lederman | ............... B60B 7/002 301/108.3 |
| 5,711,617 | A | * | 1/1998 | Scheller | ................ F16C 23/084 384/484 |

(Continued)

*Primary Examiner* — Thomas R Hannon
(74) *Attorney, Agent, or Firm* — Bryan Peckjian; SKF USA Inc. Patent Dept.

(57) ABSTRACT

A support assembly for movable shafts including a bearing for receiving the movable shaft, a bearing housing having an annular housing, in an internal seat that is mounted to the bearing, and a lid to close fluid tight an opening of the seat for the bearing, the cover is made in one piece in a polymeric material and has a portion that is coupled on a radially outer lateral surface for housing the annular element and that is provided with an annular sealing lip which extends frontally projecting from a front edge of the coupling portion, which is made of the same polymeric material of the cover and which is elastically deformable in the radial direction from the inside towards the outside. The annular sealing lip being coupled with interference with a portion of the radially outer conical lateral surface housing the annular element.

7 Claims, 2 Drawing Sheets

(56) References Cited

U.S. PATENT DOCUMENTS

| | | | |
|---|---|---|---|
| 7,011,593 B2* | 3/2006 | Schenk | F16C 13/006 |
| | | | 384/477 |
| 7,448,807 B2* | 11/2008 | Schenk | F16C 13/006 |
| | | | 384/417 |
| 8,840,311 B2* | 9/2014 | Landrieve | F16C 23/084 |
| | | | 384/448 |
| 9,371,860 B2* | 6/2016 | Ciulla | B60B 27/0073 |
| 2003/0103701 A1* | 6/2003 | Steinebach | F16C 33/723 |
| | | | 384/489 |

* cited by examiner

COVER FOR A BEARING HOUSING AND A SUPPORT ASSEMBLY FOR ROTATING SHAFT ASSOCIATED

CROSS REFERENCE

This is a United States National Stage Application claiming the benefit of International Application Number PCT/IB2016/000371 filed on Mar. 24, 2016, which claims the benefit of Italian Patent Application 102015000010467 filed on Mar. 31, 2015, both of which are incorporated herein by reference in their entireties. Applicant note, the thirty (30) month anniversary of the priority date of the International Application falls on a Saturday. Therefore, Applicant is afforded until the next business day, Monday 2 Oct. 2017 to file this subject Application under 35 U.S.C. 371.

TECHNICAL FIELD OF INVENTION

The present invention relates to a cover for a bearing housing. In particular, a cover for a bearing housing intended to be mounted on machines for the food industry, as well as to a support assembly for movable shafts, for example rotating, including the cover, a bearing housing and a bearing, for example a rolling bearing.

KNOWN ART

As it is known, the machines used in the food industry have many moving parts supported by sliding or rotating shafts, for example, conveyor belts, kneading machines, machines for washing of fresh food.

All these machines must be cleaned frequently, usually with water added with detergent and/or disinfectants, in order to check the possible occurrence of bacterial colonies which may pollute foods. It is particularly necessary, that each of these machines not present in the interstices or other parts where dirt or even only washing water can penetrate and stagnate. The stagnation of liquids or moisture favors a possible proliferation of bacteria.

This problem is particularly felt with respect to the complex support of sliding shafts where a shaft terminal end is housed, or is a feedthrough type. These support complexes, are formed by a housing element, generally annular, provided with a base or mounting flange to the machine, by a bearing, typically a rolling bearing (but could also be a sliding bearing), mounted to the inner housing and which is coupled with the movable shaft, and a cover, normally cup-shaped, which is coupled in a forced manner on the element housing. In the case of a through-shaft, it is provided with a center hole-through with a gasket for the passage and sealing of the shaft.

Currently using two different types of forced assemblies, in which the seal towards the external contaminants is effected by means of an O-ring interposed radially or frontally between the cover and the housing element and in both of which the seal towards the external contaminants and, above, the jets of washing fluid under pressure, is not satisfactory, so much so that after the washings is found in the washing fluid entering the inside of the lid. In addition, the O-ring presence inevitably involves the creation of interstices between the housing element and cover, the interstices in which water and dirt can stagnate.

SUMMARY OF THE INVENTION

The object of the present invention is to provide a lid for a bearing housing, in particular intended to be mounted on machines for the food industry, that cover, devoid of the drawbacks of the art known. The present invention ensures a good sealing action between the lid and housing element so that stagnation of liquids and dirt are avoided.

According to the invention a lid for a bearing housing and a support assembly is provided.

BRIEF DESCRIPTION OF DRAWINGS

The invention will now be described with reference to the accompanying drawings, which illustrate a non-limiting example of embodiment thereof, wherein.

DETAILED DESCRIPTION

Figure 1:
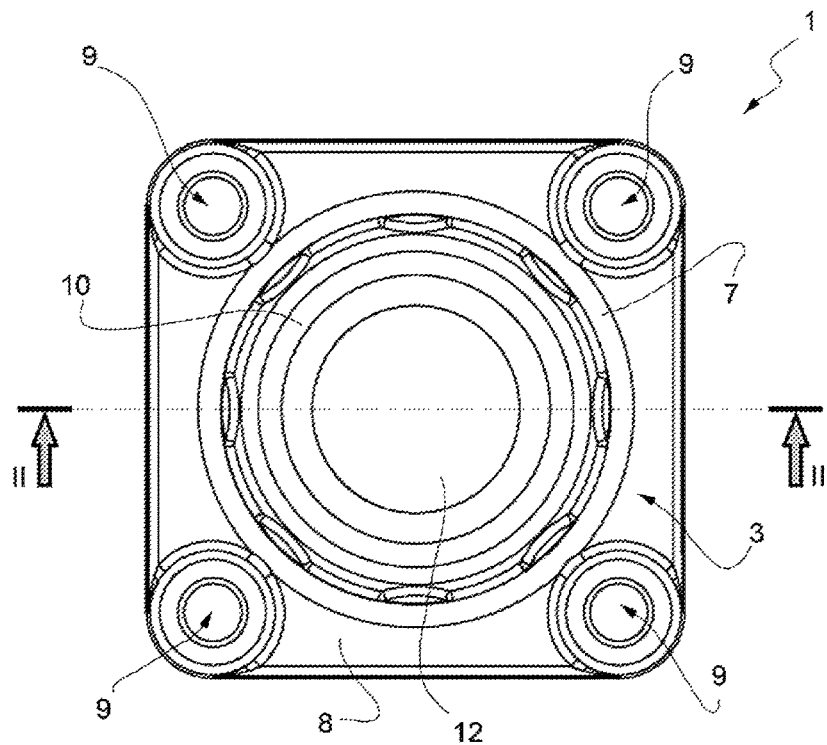
FIG. 1 shows a front elevational view of a non-limiting embodiment of a support assembly for shafts according to the invention.
Figure 2:
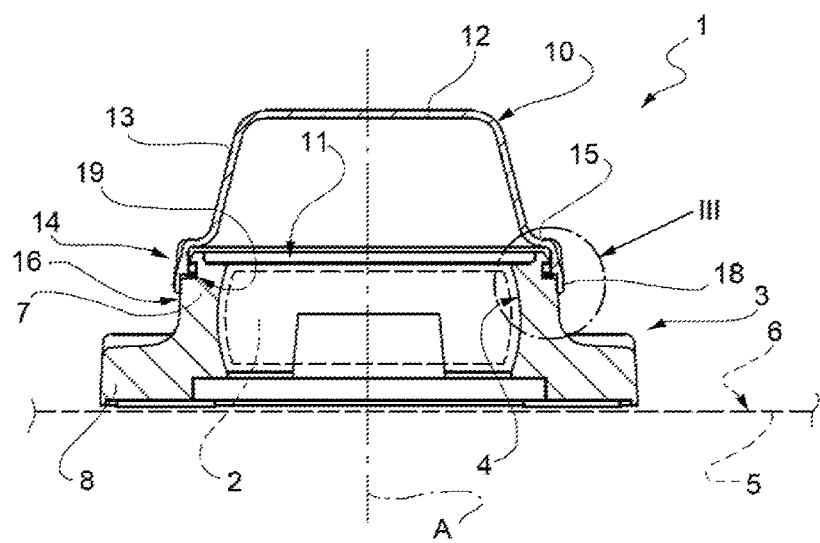
FIG. 2 shows a view sectioned along a support assembly of the FIG. 1 plane II-II with the cover and where a bearing is illustrated only schematically by a dashed line block.
Figure 3:
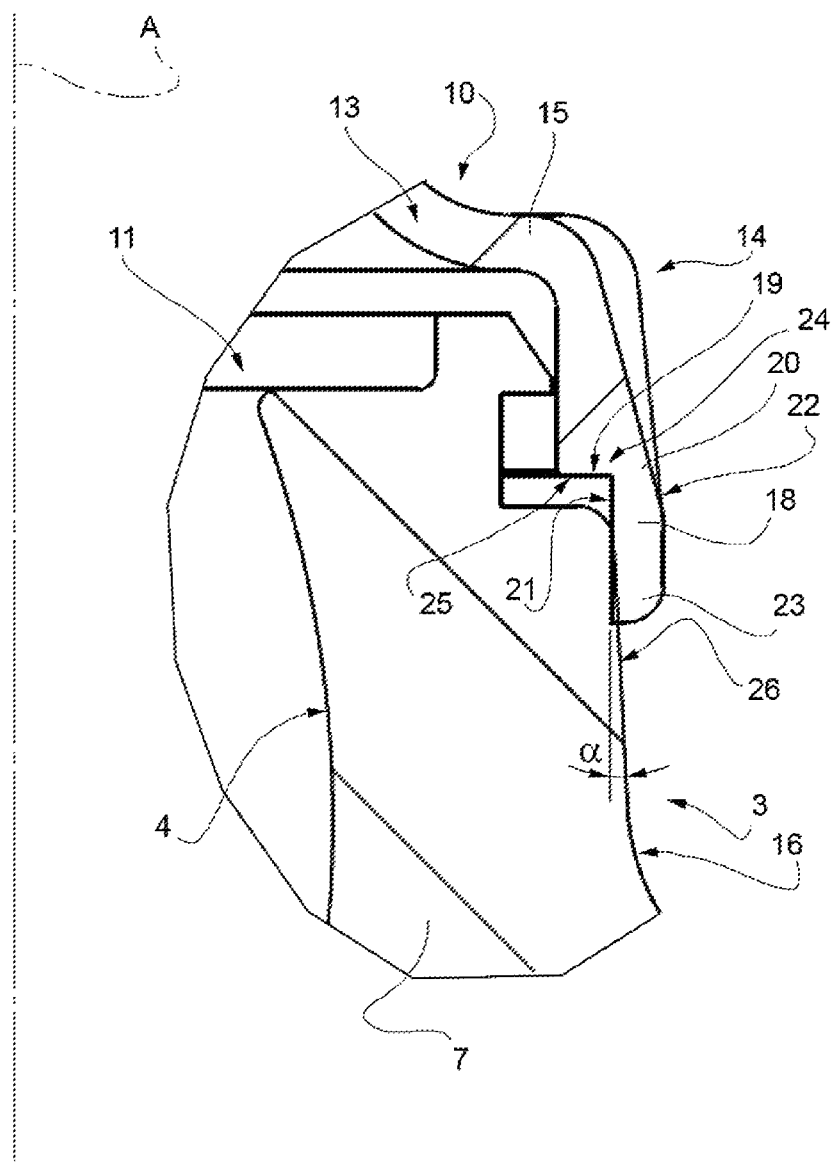
FIG. 3 illustrates in enlarged scale and in section a detail III of the coupling between the cover and forming part of a housing element of the support assembly of FIG. 1.

With reference to FIGS. 1 to 3, number 1 indicates a support assembly for furniture shafts, rotating or sliding, not illustrated for simplicity.

The support assembly 1 comprises a bearing 2 (FIG. 2), for example a rolling bearing, known and illustrated schematically in broken lines for simplicity, adapted to receive in a movable shaft known manner, for example rotating, to support it, and a housing of buffer 3 having a through seat 4 within which is received the bearing 2 in a stable and known manner, therefore not illustrated for simplicity.

The bearing housing 3, in particular, is intended to be mounted on machines for the food industry. The bearing housing is illustrated in radial section and in more detail in FIG. 2. The bearing housing 3 is of the type intended to be rigidly mounted on a frame 5 of a known type of machine, only partially shown in phantom in FIG. 2, and in particular, against a flat surface 6 of a machine frame 5 for the food industry.

The bearing housing 3 comprises a housing element 7, in the annular complex, designed to be adapted to receive in a known manner, to its interior, in particular in the seat 4, the bearing 2, and a base or flange 8 of fastening to the machine frame 5; the seat 4 in general presents an axis of symmetry A and the bearing 2 is generally mounted in the seat 4 coaxial with the axis A; in the case illustrated the seat 4 has a curved lateral surface to allow the possible oscillations of the bearing 2 in order to compensate for any misalignment.

The base or flange 8 is provided with through holes 9 for screws or bolts (known and not illustrated for simplicity) through/which the base or flange 8 and with it the whole support assembly 1 are fixed rigidly to the flat surface 6 of the frame 5.

Obviously, the shape of the bearing housing 3 illustrated is only one possible; for example, the base or flange 8, which in the illustrated example is square and perpendicular to the axis. Other symmetrical or asymmetrical shapes and/or may be formed offset (ie eccentric axis with respect to axis A) and the side relative to the housing 7.

In any case, the support assembly 1 also comprises a cover 10 to close in a fluid-sealing a mouth 11 of the inner housing 4 of the housing 7 within which the bearing 2 is mounted.

The lid 10 for the bearing housing 3 is generally cup-shaped and includes a bottom wall 12, an annular side wall 13 that extends transversely to the bottom wall 12 and a coupling portion 14 toward the bearing housing 3.

The coupling portion 14 is annular, and is formed integrally in one piece on one end 15 of the side wall 13 opposite to the bottom wall 12 and is designed to be coupled with the bearing housing 3 laterally on the outside of the bearing housing 3. In the present case it is shaped as a cup joint and is coupled laterally and radially on the outside on a lateral surface 16 radially outside of the annular housing 7, and always present in any embodiment.

The side surface 16 and the coupling portion 14 are defined by a solid of revolution and have a common axis of symmetry, which coincides with the axis A when the lid 10 is mounted on the housing 7.

According to a feature of the invention, the cover 10 is made in one piece in a polymeric material, preferably but not necessarily of synthetic plastic material and the coupling portion 14 is provided on the side opposite to the bottom wall 12 of an annular lip of seal 18, which extends frontally projecting from a front edge 19 of the coupling portion 14 and which is made of the same polymeric material of the lid 10.

In particular, the annular sealing lip 18 is formed integrally in one piece with the coupling portion 14 and is constrained to the front edge 19 by a root portion 20 (FIG. 3) forming part of the lip 18 and having a reduced radial thickness compared to the rest of the lip 18, so that the lip 18 is to be elastically deformable in the radial direction, at least in a direction from the inside towards the outside and, preferably, vice versa.

The annular lip seal 18 is, according to a further aspect of the invention, delimited radially on the inside by a lateral surface 21 substantially cylindrical while it is delimited radially outwards by a side surface 22 oblique (with respect to axis A) or curve shaped so that the lip seal 18 preferably has its maximum radial thickness in the vicinity of a free end 23 and its minimum radial thickness in correspondence of the root portion 20. the shape of the lip 18 described here is purely exemplary and not limiting. In essence, the sealing lip 18 is formed so as to possess the necessary flexibility as to mate with the surface 16, as better explained in the following.

According to the invention, the bottom wall 12, the side wall 13, the coupling portion 14 and the sealing lip 18 are all made in a polymeric material, preferably but not necessarily polyurethane, by injection molding in a single piece. Surprisingly, such specifically selected material is one that has shown itself capable of imparting sufficient rigidity to the lid 10, such as to allow it to be coupled stably in any way, for example planted to interference or snap or bayonet, externally on the housing of the bearing 3, and at the same time to impart to the lid 10 a sufficient elasticity/flexibility as to allow the sealing lip 18 to effectively perform its task in contact cooperating in fluidtight manner and in a self-draining with the lateral surface 16.

The annular sealing lip 18 is formed on a radially outer annular portion 24 of the front edge 19 of the coupling portion 14 to which it is bound through its root portion 20, so that between the sealing lip 18 and the front edge 19 it is defined radially on the inside an annular step 25 (FIG. 3).

In particular, according to a further and not secondary aspect of the invention, the annular sealing lip 18 mates in fluidtight manner and with radial interference with a portion 26 of the side surface 16 of the radially outer annular housing element 7, portion 26 which it is constituted by a portion of a conical surface having a taper facing towards the cover 10 and an axis of symmetry coinciding with the axis A.

Here and hereinafter, the term "taper" of a conical or frusto-conical surface means the side toward which the vertex of the geometric cone facing bounding this surface. Then the housing 7 annular element tapers in correspondence with the conical surface portion 26 to progressively decrease its radial thickness toward the lid 10.

The section of the conical surface 26 defining the tract of the radially outer lateral surface 16 of housing annular element 7, which is coupled with interference with the annular lip 18 has, according to a further aspect of the invention, an inclination with respect to its axis of symmetry which is indicated as angle "a" in FIG. 3. The angle "o" is an acute angle, preferably less than 10° and, as experimentally determined, ranging between 3° and 7°, inclination and which proved to be after much experimental work, the optimal one to get a good hydraulic seal and make the lip 18 self-draining.

Furthermore, the combination of an elastically deformable lip 18 made of a polymeric material, preferably but not necessarily polyurethane, with a surface of conical coupling 26 having suitable angle not only allows to avoid the formation of any unwanted gap between lip 18 and housing element 7, resulting in the absence of danger of unwanted accumulation of dirt or moisture accumulation, but also allows you to compensate for any dimensional inaccuracies in the housing of the bearing 3.

All the objects of the invention are therefore achieved.

The invention claimed is:

1. A cover for a bearing housing mounted on machinery for the food processing industry, comprising:
   a bottom wall,
   an annular lateral wall that extends transversely to the bottom wall, and
   a coupling portion towards the bearing housing obtained integrally on an end of the lateral wall opposite to the bottom wall; wherein
   the cover is made in one piece of a polymeric material;
   the coupling portion is designed to couple with the bearing housing laterally on the outside of the bearing housing;
   the coupling portion is provided on the side opposite to the bottom wall with an annular sealing lip that extends frontally and overhangingly from a frontal rim of the coupling portion and which is made of the same polymeric material as the cover and is obtained integrally in one piece with the coupling portion;
   the annular sealing lip is constrained to the frontal rim of the coupling portion so that the is elastically deformable in a radial direction from the inside outwards, wherein
   the annular sealing lip is constrained to the frontal rim of the coupling portion by a root portion having a reduced radial thickness, is delimited radially on the inside by a substantially cylindrical lateral surface, while it is delimited radially on the outside by an oblique or curved lateral surface-shaped so that the sealing lip has a maximum radial thickness thereof near a free end thereof and a minimum radial thickness thereof at the root portion.

2. The cover for a bearing housing according to claim 1, wherein the bottom wall, the lateral wall, the coupling portion and the sealing lip are made of a polymeric material, by molding in one piece.

3. The cover for a bearing housing according to claim 1, wherein the annular sealing lip is obtained on a radially outer annular portion of the frontal rim of the coupling portion to which it is constrained by its root portion, so that an annular step is defined radially on the inside between the sealing lip and the frontal rim.

4. A bearing assembly for moveable shafts, either rotating or sliding, comprising:
a bearing adapted to receive the moveable shaft,
a bearing housing having an annular housing element and a base or flange for fastening to a machinery framework, and a cover for closing an inlet opening of an inner seat of the housing element in which the bearing is mounted in a fluid-tight manner; wherein
the cover is made in one piece of a polymeric material and comprises a bottom wall, an annular lateral wall which extends transversely to the bottom wall and a coupling portion towards the bearing housing obtained integrally on one end of the lateral wall opposite to the bottom wall;
the coupling portion is coupled on a radially outer lateral surface of the annular housing element, laterally on the outside of the radially outer lateral surface of the annular housing element;
the coupling portion is provided on the side opposite to the bottom wall of an annular sealing lip which extends frontally and overhangingly from a frontal rim of the coupling portion and which is made of the same polymeric material as the cover to be elastically deformable in radial direction from the inside outwards;
the annular sealing lip is coupled in a fluid-tight manner and with radial interference with a portion of the radially outer lateral surface of the annular housing element, wherein
the portion of the radially outer lateral surface of the annular housing element which is coupled by interference with the annular lip is a conical surface portion having conicity facing towards the cover.

5. The bearing assembly for moveable shafts according to claim 4,
wherein the conical surface portion defining the portion of the radially outer lateral surface of the annular housing element which is coupled by interference with the annular lip has an inclination with respect to a symmetry axis defining an acute angle less than 10°.

6. The bearing assembly for moveable shafts according to claim 4, wherein the cover and the annular sealing lip are made in a polymeric material by molding in a one piece.

7. The bearing assembly for moveable shafts according to claim 4, wherein the annular sealing lip is radially delimited on the inside by a substantially cylindrical lateral surface while it is delimited radially on the outside by an oblique or curved lateral surface shaped so that the sealing lip has a maximum radial thickness thereof near a free end thereof and a minimum radial thickness thereof at a root portion thereof by means of which it is constrained to the coupling portion.

* * * * *